United States Patent [19]
Asmus et al.

[11] 3,991,609
[45] Nov. 16, 1976

[54] BRAKE TESTING APPARATUS AND METHOD INCORPORATING HYDRAULIC POSITION-SENSITIVE SUBSYSTEM

[75] Inventors: Carl Junior Asmus; Woodrow Christman Wickersham, both of Los Angeles, Calif.

[73] Assignee: Clayton Manufacturing Co., El Monte, Calif.

[22] Filed: Mar. 31, 1975

[21] Appl. No.: 563,329

[52] U.S. Cl. ............................................... 73/132
[51] Int. Cl.² ......................................... G01L 5/28
[58] Field of Search ............ 73/129, 132, 126, 117; 254/DIG. 5; 74/512, 514

[56] References Cited
UNITED STATES PATENTS

| | | | |
|---|---|---|---|
| 3,465,577 | 9/1969 | Donovan | 73/132 UX |
| 3,633,412 | 1/1972 | Pelta | 73/132 X |
| 3,662,593 | 5/1972 | Pirrello et al. | 73/132 |
| 3,713,332 | 1/1973 | Herrbrich | 73/132 X |

Primary Examiner—Jerry W. Myracle
Attorney, Agent, or Firm—Jackson & Jones Law Corporation

[57] ABSTRACT

A brake testing apparatus and method are disclosed which utilize a hydraulic subsystem as a stroke-limiting memory unit and as a position-holding means during the brake test sequence. The hydraulic subsystem is designed for inclusion in a brake testing means which performs a series of analyzable brake tests using a controlled force application system which applies the brakes under different, but predetermined, conditions in a series of successive brake applications. The stroke measuring memory unit uses the hydraulic subsystem to measure the distance of one brake application stroke and limits the next brake application stroke to that distance. The position-holding means utilizes the hydraulic subsystem to retain a given brake-applying position of the testing apparatus for the length of time desired in certain brake applications in the testing series.

14 Claims, 4 Drawing Figures

BRAKE TESTING APPARATUS AND METHOD INCORPORATING HYDRAULIC POSITION-SENSITIVE SUBSYSTEM

BACKGROUND OF THE INVENTION

In Cline application Ser. No. 382,538, filed July 25, 1973, now U.S. Pat. No. 3,899,916 relating to "Recorder and Computer Type Brake Analyzer and Method," and assigned to the assignee of this application, a complete brake testing system is described in which a series of accurately controlled brake tests are systematically performed to provide brake performance data which is then evaluated to determine whether the brakes are malfunctioning. As explained in that application, after an initial rolling resistance test has established the unbraked resistance to vehicle wheel motion, three successive brake application strokes are designed to test first primarily for mechanical malfunctions in the brakes at the wheels, then primarily for hydraulic malfunctions in the hydraulic pressure transmitting system, and finally primarily for malfunctions at the frictional engaging surfaces. In each of the tests, the most significant indication of malfunction is imbalance between the left and right brakes, particularly those at the front of the vehicle but also, to a lesser extent, those at the rear of the vehicle. The absolute performance of each brake separately may also be significant, but to a lesser extent than relative values indicating left-to-right imbalance.

The following quotations from the specification of the Cline application, outline the steps which are useful in explaining the present invention:

"The first step of the procedure is to record the rolling resistance of the wheels with brakes released. This is necessary in order to establish the value of the resistance to rotation of the wheels with no brake engagement in order to provide a "base" for the charted readings."

"The second step of the test procedure is to apply the brakes gradually to a moderate magnitude of 50 to 70 pounds brake effort above the rolling resistance, hold this lever of effort for one or two seconds, and then release the brakes gradually. This step combines the tests of brake shoe engagement-lag, pre-hydraulic and brake shoe seating capability, and a brake release test."

"The third step of the test procedure comprises a rapid application of the brakes of 50 to 70 pounds above rolling resistance, followed by a quick release. This test evaluates the response and the other functioning of the actuating system and is basically a test to determine if there is a restriction to fluid flow in the system."

"The fourth and last step of the test procedure comprises a normal application of the brakes to an appropriate high level effort maintained for 5 to 6 seconds, followed by a normal release. This step of the test includes a test of the brake effort at comfort level application, brake effort at high level application, and constant imbalance, fade, and excursion at high level brake effort."

The fourth step referred to in the quotations is designed to check primarily the frictional subsystem of the vehicle brakes — i.e., the energy-absorbing frictional components associated with each wheel.

The third step referred to in the quotations is designed to check primarily the hydraulic subsystem of the vehicle brakes — i.e., the actuation signal from the driver to each wheel brake. (The hydraulic subsystem of the vehicle brake is not the same as, and should not be confused with, the hydraulic subsystem of the brake testing apparatus which constitutes the primary focus of this application).

The second step referred to in the quotations is designed to check primarily the mechanical subsystem of the vehicle brakes — i.e., transformation of the hydraulic pressure signal into movement of the friction surfaces into contact.

In Clayton and Cline application Ser. No. 382,385 filed July 25, 1973, now U.S. Pat. No. 3,877,299 relating to "Brake Pedal Actuator" and assigned to the assignee of this application, a removable brake pedal actuator is disclosed which is placed on the vehicle floorboard and which uses a differential air pressure power unit to apply force to the brake pedal until a predetermined level of brake effort is reached, manual force applied by the operator being utilized to provide a reference force, or reaction point, which holds the brake pedal actuator in position. With the brake pedal actuator in position, air pressure can be applied under suitable control to cause the series of brake application strokes discussed above.

The desirability of improving the control of the brake application strokes in the testing series has led to the present invention. (The first, second and third brake application strokes correspond, respectively, to the second, third and fourth steps in the above quotations from application ser. no. 382,538).

SUMMARY OF THE INVENTION

In the present invention a hydraulic subsystem is combined with the removable brake pedal actuator in a brake testing system to provide both a stroke-limiting memory unit and a position-holding means which can retain the brake pedal in its applied position for a desired length of time during the testing sequence.

The hydraulic sybsystem comprises a variable volume hydraulic chamber which reduces its volume as the pedal actuator moves the pedal on its brake-applying stroke and increases its volume as the pedal returns to released position, a hydraulic tank or reservoir which receives hydraulic fluid from, or transfers it to, the variable volume chamber, and a shut-off means which can be used to disconnect the variable volume chamber from the reservoir, thereby either (a) preventing further escape of fluid from the variable volume chamber and thus limiting the brake-applying motion of the pedal, or (b) preventing return of fluid from the reservoir to the variable volume chamber during the return stroke of the pedal. In conjunction with the latter function, a floating piston, which is normally held in operative engagement with a maximum position stop by the hydraulic fluid in the subsystem, is caused to move away from such operative engagement during the return stroke of the pedal due to the incipient vacuum created by the lack of hydraulic return flow from the reservoir, the extent of such motion of the floating piston being controlled by the length of the actuator return stroke, and being reversible on the next application stroke to cause the length of that stroke to equal the length of the preceding application stroke.

This subsystem permits using the length of that pedal stroke in the testing series which checks for mechanical defects at the wheel brakes to limit the length of the subsequent stroke which checks for defects in the vehicle hydraulic actuation system. In the earlier stroke, the brake pedal is gradually depressed by the actuator until a particular level of brake effort is reached, say 70 lbs. above the rolling resistance. Such problems as sticking of the wheel cylinder pistons, excessive sliding friction in the brake assemblies, and return spring problems are uncovered with the application and release of this stroke. The brake pedal must be depressed gradually so it will not override the resistances being tested. On the other hand, the subsequent stroke to check for restrictions in the brake hydraulic system is a jab stroke which relies on a quick actuator stroke for its function. This stroke must, therefore, be position-limited rather than force-limited. We have learned that an excellent method of establishing the length of the jab stroke is to measure the length of the earlier stroke and use that value to limit the jab stroke.

We have also discovered that the first and third test strokes, particularly the latter, should be held in a particular brake applying position for the desired length of brake-applying time, once the testing level of brake effort has been reached. Previous arrangements designed to hold the brakes applied for the desired time by maintaining a constant application force have not been entirely satisfactory because of the variations and idiosyncrasies of vehicle braking systems, particularly power-assisted systems. We have discovered that the test results are much more useful if the pedal is held in the same position for the duration of the test application, rather than being subjected to a constant application force. And an effective means of accomplishing that "position-sensitive" holding is to interpose a closed hydraulic link between the pedal power actuator and the pedal.

DETAILED DESCRIPTION OF THE PREFERRED EMBODIMENT

Figure 1:
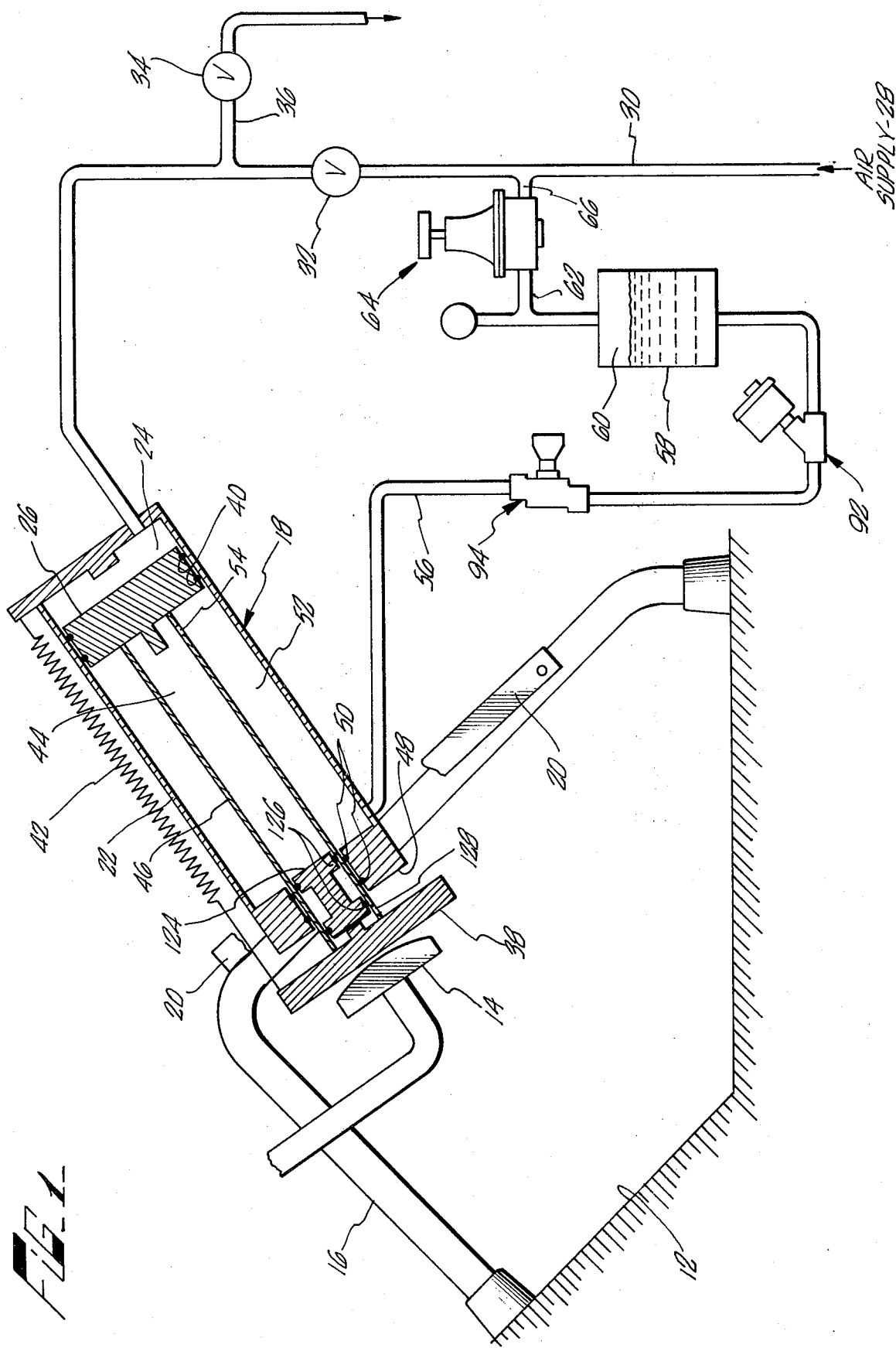
FIG. 1 is a general diagrammatic view of a hydraulic subsystem combined with a brake pedal actuator, mounted in a vehicle for brake testing, the power actuator unit being shown in partial section.

In FIG. 1, the hydraulic subsystem of the brake testing apparatus is shown in conjunction with a brake pedal actuator arrangement similar to that disclosed in application Ser. No. 382,385 referred to above. The vehicle floorboard is shown at 12, and the brake control member, or pedal, at 14, the pedal being pivotally mounted on the vehicle frame in accordance with the design of whatever vehicle is being tested.

A bridge support, or frame, 16 is temporarily placed on the vehicle floorboard in order to provide accurately controlled pedal actuating force during the brake testing sequence, as explained in the earlier filed applications identified above.

A power actuator unit 18 constitutes a part of the brake pedal actuator device, and is supported on the frame 16. An operator operated foot treadle 20 is pivotally supported on the frame 16 and in operative engagement with the power actuator housing 22 so that reaction of the housing during the power stroke of the actuator is resisted by the operator's force.

The power actuator unit may be energized by a suitable fluid pressure means, such as a compressed air system. When air under pressure is introduced into chamber 24 in the power actuator, pressure is exerted tending to push the movable wall, or piston, 26 in the power actuator against the brake pedal 14. The reaction pressure on housing 22 is resisted by the force exerted by the operator's foot on treadle 20.

The air pressure system is shown diagrammatically to comprise an air pressure source 28 connected to the chamber 24 by a passageway 30, an inlet control valve 32 in the passageway 30, and an exhaust control valve 34 in a passageway 36 which opens into passageway 30. The inlet and exhaust valves, which may, of course, be part of a unitary valve assembly, are preferably controlled automatically by a computerized brake testing control system (not shown), but they could be manually controlled.

A pedal-engaging member 38 is in operative engagement with the pedal 14 during the testing sequence, and is movable back and forth with the pressure responsive movable wall 26 in the power actuator, which is shown as a piston having suitable peripheral sealing members 40 which prevent passage of fluid from one side of the piston to the other. The pedal-engaging member 38 must be slightly spaced from the pedal 14 in released, or retracted, position so that there will be no brake applying force prior to the testing sequence.

The force which moves the piston 26 and member 38 in the left, or brake-applying, direction is the air pressure in chamber 24, whereas the force which moves the piston 26 and member 38 in the right, or brake-releasing, direction is a resilient return or retraction means, such as the tension spring 42 which is shown connected to the pedal engaging member 38 at one end and to the actuator housing 22 at the other end.

As explained in application Ser. No. 382,385, the actuator housing 22 is operatively connected to both the frame 16 and operator treadle 20, so that any operator force in excess of that required to depress the brake pedal to the desired brake effort level is conveyed to the vehicle floorboard via frame 16.

The hydraulic subsystem which is of primary concern in this application includes basically two variable volume chambers in continuous communication with one another, a reservoir connected thereto, and a shut-off valve in the connection which can prevent the reservoir from communicating with the variable volume chambers.

One such variable volume chamber 44 is conveniently provided within a hollow force-transmitting member, or rod, 46 which transmits force between piston 26 and member 38. The hollow rod 46 is secured to piston 26 for support at one end and is supported at the other end in the left wall 48 of housing 22, said housing wall 48 carrying suitable annular seals 50 to prevent leakage of hydraulic fluid.

The other variable volume chamber 52 is conveniently provided by the annular space between the cylindrical inner wall of housing 22 and the cylindrical outer surface of rod 46. The ends of chamber 52 are provided by housing end wall 48 and piston 26. The two variable volume chambers 44 and 52 are continuously in communication with one another via one or more ports 54 in rod 46.

Chambers 44 and 52 are filled with hydraulic fluid, and are connected in released position via passageway 56 with a hydraulic reservoir 58. The reservoir 58 provides a storage place for hydraulic fluid displaced from chamber 52. Preferably means are provided to maintain normally in reservoir 58, and in the hydraulic subsystem, a pressure slightly above atmospheric, say 5 lbs./square inch. To this end the air space 60 above the liquid in reservoir 58 may be connected by a passageway 62 to a regulator valve 64, which in turn is connected by passageway 66 to a pressure source, such as air pressure source 28.

Figure 2:
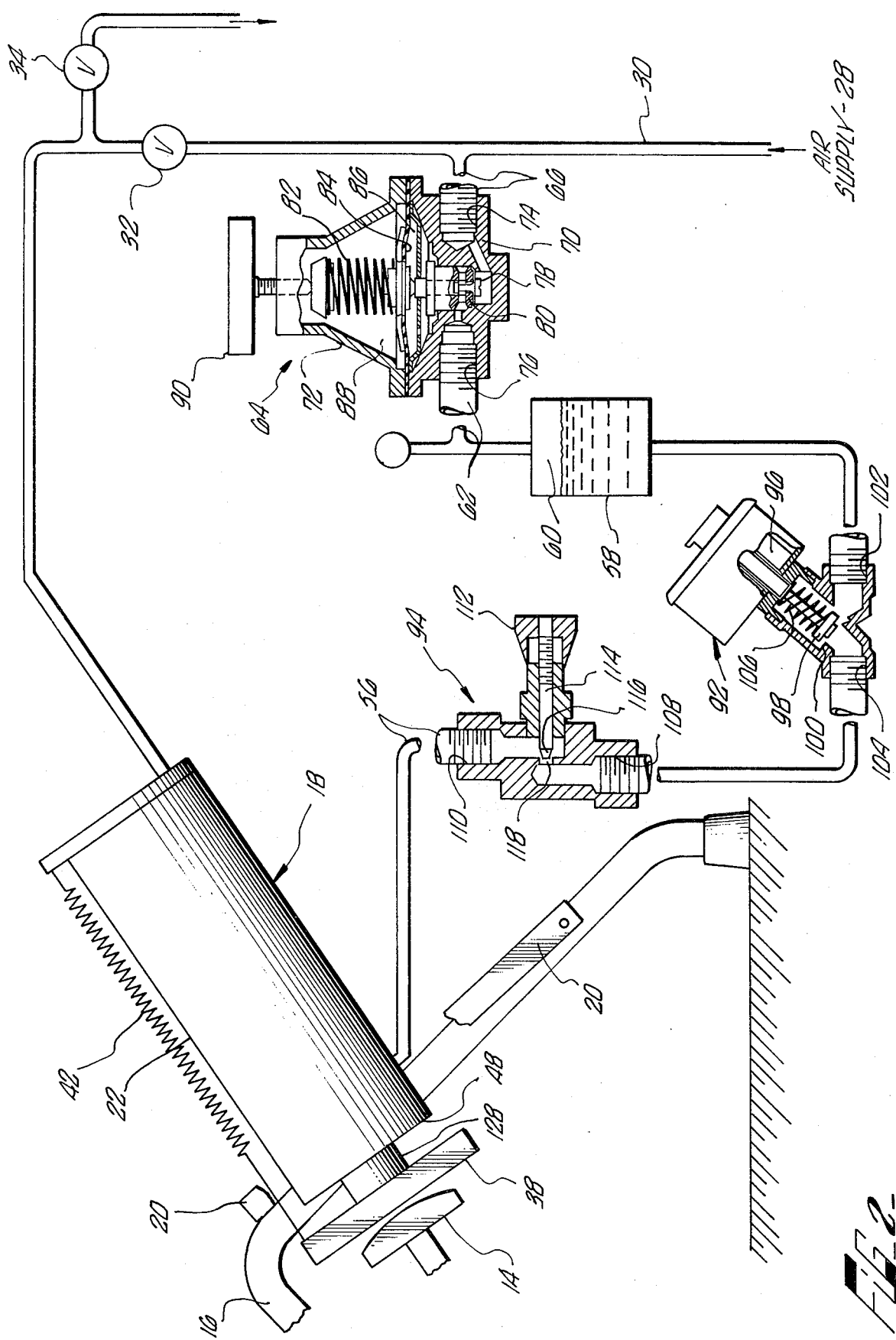
FIG. 2 is a general view of the hydraulic subsystem of FIG. 1 in released, or retracted, position, each unit being shown in section.

The regulator valve 64, as shown in sectional view in FIG. 2, may be a commercially obtainable valve, such as Model H-10XT of Conoflow Corporation. It comprises a valve portion 70 and a control portion 72. The valve portion has an inlet port 74 communicating with the pressure source 28 and an outlet port 76 communicating with the reservoir chamber 60. The flow of pressure fluid from inlet port 74 to outlet port 76 is controlled by a poppet valve 78, which is urged away from its seat 80 by a compression spring 82 and toward its seat 80 by a diaphragm 84, the diaphragm being urged upwardly against spring 82 by the differential pressure of the outlet port pressure in chamber 86 acting against atmospheric pressure in chamber 88. The outlet pressure, which is the reservoir pressure, may be adjusted by turning adjusting screw 90 to vary the force on spring 82.

Communication between reservoir 58 and chamber 52 is subject to the control of two valve means 92 and 94 inserted in series in passageway 56.

Valve means 92, which is of greater importance, is a shut-off means used to either permit or prevent flow of hydraulic fluid between chamber 52 and reservoir 58, under the circumstances and for the purposes detailed below. The shut-off valve means 92 may be a commercially available solenoid valve unit, such as the ASCO valve unit shown in section in FIG. 2. As long as solenoid coil 96 is energized, valve member 98 is held away from its seat 100, thereby permitting free flow of hydraulic fluid between inlet port 102 and outlet port 104.

When the solenoid coil 96 is deenergized, spring 106 will move valve 98 against valve seat 100, thereby cutting off fluid flow. A solenoid valve can be readily controlled automatically by an electonic control system of the type disclosed in application Ser. No. 382,538.

Valve means 94 is a variable restriction means which permits throttling of fluid flow between chamber 52 and reservoir 58, thereby limiting the rate at which the brake pedal is depressed. The variable restriction valve 94 may be a commercially available needle valve, such as Model NK of Auto-Ponents Inc., shown in section in FIG. 2. The rate of flow between inlet port 108 and outlet port 110 is controlled by turning handle 112 to move in an opening or closing direction the threaded stem 114 of a needle valve having a tapered portion 116 which extends into, and varies the effective size of, an orifice 118 between inlet port 108 and outlet port 110.

The hydraulic memory aspect of this invention utilizes a pressure responsive floating member, or piston, 124, which is reciprocable inside hollow rod 46, suitable seals 126 being peripherally associated with the floating piston to prevent leakage of hydraulic fluid from chamber 44. In the at rest position of the hydraulic subsystem, piston 124 is held against the pedal-engaging member 38 by the light pressure in the hydraulic subsystem. The left side of piston 124 is exposed at all times to atmospheric pressure via one or more ports 128.

OPERATION OF THE SYSTEM

As stated above, after the rolling resistance has been determined, the first brake testing pedal actuation stroke is preferably used to check for mechanical malfunctions at the wheel brakes. It is desirable that the brake pedal be depressed gradually, so that "sticking" components will not be dislodged during this phase of the test until their tendency to cause braking imbalance has been measured. Therefore, in valve means 94, the needle valve 116 is moved to a position in which it somewhat restricts flow of hydraulic fluid through orifice 118. In valve means 92, the valve member 98 is in its open position, away from valve seat 100. Control of both valve means 92 and 94 may be accomplished manually, but valve means 92 is preferably controlled automatically by the signals of the brake testing apparatus.

The actuation stroke of pedal 14 is initiated by closing air pressure exhaust valve means 34 and opening air pressure inlet valve means 32, thereby increasing the pressure in chamber 24. Here again, valve means 32 and 34 may be controlled manually, but they are preferably controlled automatically by the signals of the brake testing apparatus.

The air pressure developed in chamber 24 moves piston 26, hollow rod 46, contact member 38, and pedal 14 in the left, or brake-applying, direction, overcoming the resistance of spring 42.

As the piston 26 moves toward the left, the volume of chamber 52 reduces, thereby displacing hydraulic fluid through valves 92 and 94 to the reservoir 58. Because flow through valve means 94 is somewhat restricted, the essentially imcompressible hydraulic fluid limits the rate of pedal movement and thus causes the vehicle brakes to be applied gradually.

During the application stroke of piston 26, floating piston 124 is held against contact member 38 by the pressure in the hydraulic subsystem. In other words, the volume of chamber 44 remains the same.

Figure 3:
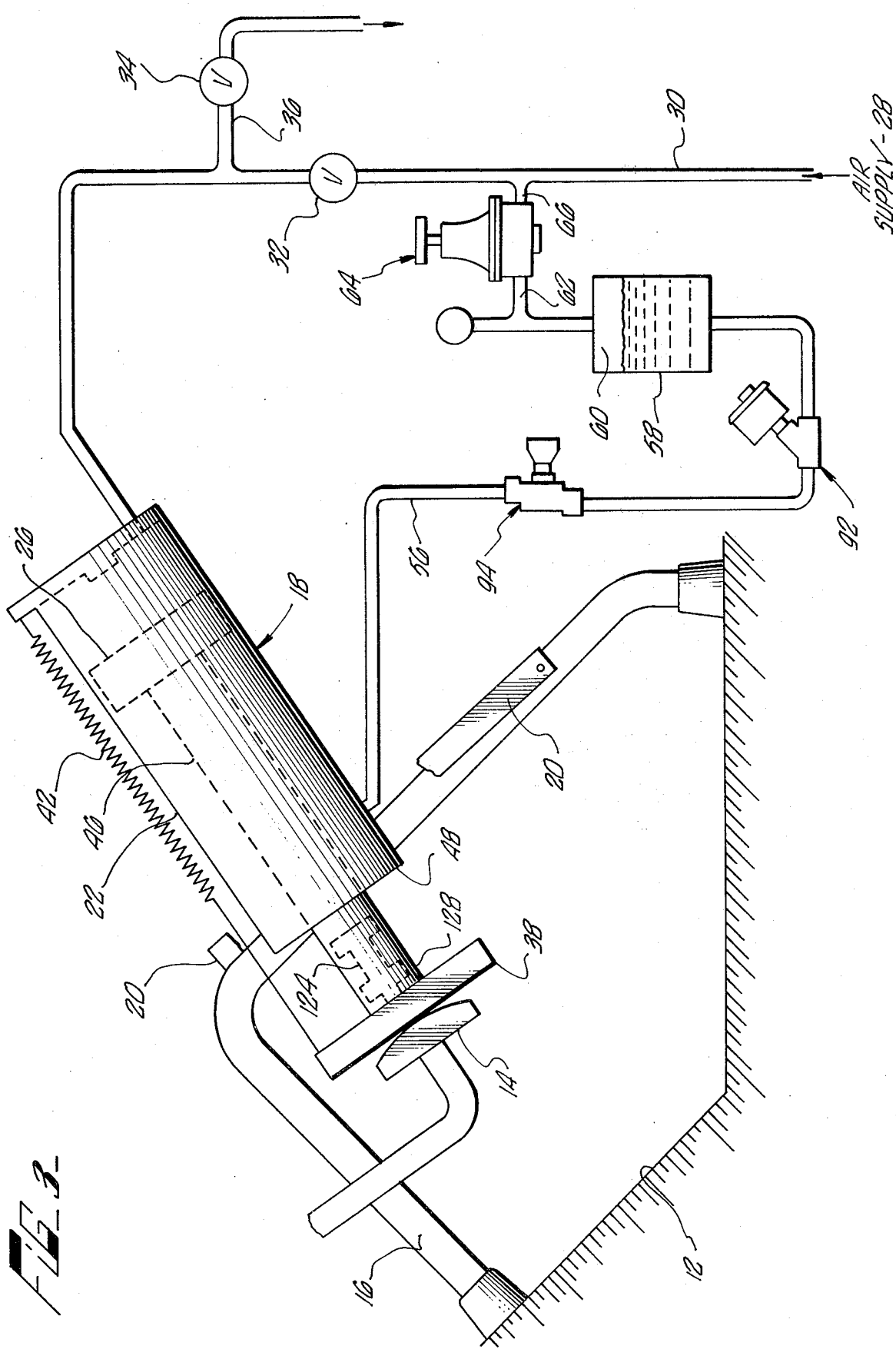
FIG. 3 shows the hydraulic subsystem in brake applied position, with the shut-off valve means in closed position.

The application stroke of the brake pedal is continued until the brake effort at the wheels reaches a predetermined level, as indicated by the dynamometer-measured force. When the desired level of brake effort is reached, the pedal is preferably held briefly in the position it has reached, (see FIG. 3) by closing shut-off valve means 92. This holds the pedal in position and prevents it from moving further to the left because the incompressible hydraulic fluid cannot be displaced from annular chamber 52. As long as air pressure is still being applied to chamber 24, the pedal will not move to the right toward released position.

After the brief position-retention of the pedal, the air pressure is removed from chamber 24, by closing inlet valve 32 and opening exhaust valve 34. This permits the resilient retraction means, spring 42, to move contact member 38, hollow rod 46, and piston 26 toward the right to their released positions. Pedal 14 will return to released position because of its own retracting mechanism in the vehicle braking system.

Figure 4:
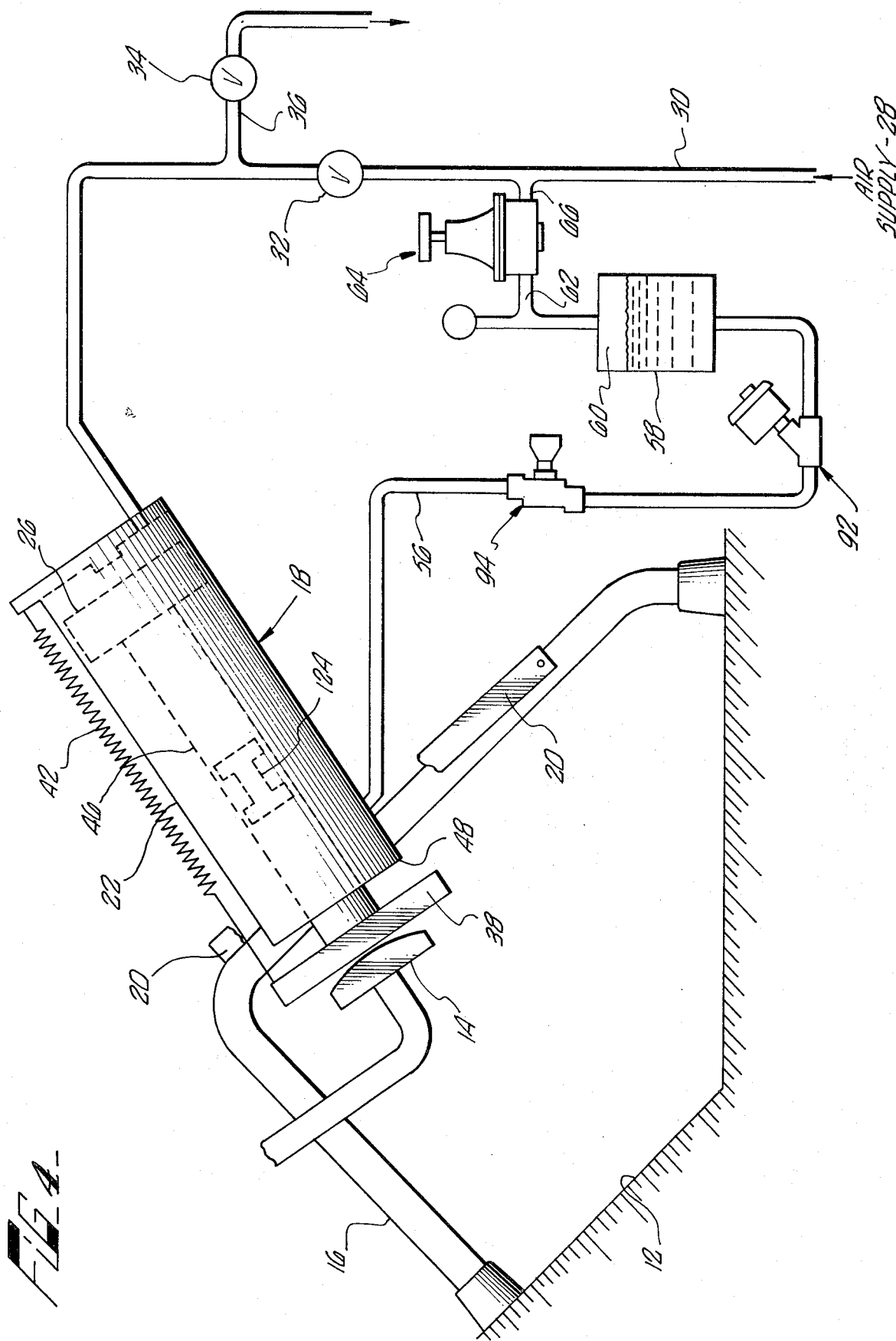
FIG. 4 shows the hydraulic subsystem in brake released position, with the shut-off valve means still in closed position, and with the hydraulic memory unit functioning.

If shut-off valve 92 is allowed to remain closed during the retraction stroke of piston 26, the hydraulic position-sensitive memory unit is utilized. As piston 26 moves to the right, annular chamber 52 enlarges. Since hydraulic fluid cannot flow from reservoir 58 to chamber 52, there is a tendency to create a vacuum in chambers 52 and 44, which are interconnected. Therefore, the atmospheric pressure on the left side of floating piston 124 moves that piston along the bore of hollow rod 46, until it reaches the position shown in FIG. 4 when piston 26 reaches its retracted position.

The next brake actuating stroke in the testing sequence preferably is a quick depression of the pedal to test for restrictions in the vehicle brake hydraulic system. As air under pressure is again introduced to chamber 24, piston 26 and contact member 38 will again move to the left, causing pedal 14 to apply force to the vehicle braking system. During this motion of piston 26, annular chamber 52 will reduce in volume. Since the hydraulic fluid in chamber 52 is cut-off by valve means 92 from reservoir 58, it will be displaced back into chamber 44, thereby forcing floating piston 124 to move to the left within bore 46. When piston 124 bottoms against contact member 38, the essentially incompressible hydraulic fluid will prevent further brake-applying motion of piston 26, thus limiting the application stroke of pedal 14. This provides a convenient means of determining where to end the second pedal stroke in the testing series. Since this second stroke calls for a rapid pedal depression, pressures in the brake hydraulic system increase rapidly, without necessarily having a proportional effect on brake effort at the wheels, so control of the stroke is preferably position-sensitive, rather than force-or-pressure-sensitive.

As soon as the position of the pedal 14 has reached the point determined by the hydraulic memory unit, shut-off valve 92 is reopened, and air pressure valves 32 and 34 are returned to pressure exhaust position, so the air pressure in chamber 24 is removed, and the system returns to its released, or retracted, position. Because hydraulic fluid can move from reservoir 58 to expanding chamber 52, no vacuum will tend to develop, and floating piston 124 will remain in engagement with contact member 38.

In the third (and normally final) actuating stroke of the pedal in the testing sequence, it is desirable to build up brake effort gradually until it reaches a higher level than previously reached, and to hold the brakes applied for several seconds. This testing procedure develops a substantial heat load in the brakes, and thus provides indication of brake fading characteristics, and generally of brake lining deficiencies.

When the desired high level of braking effort is reached, the shut-off valve means 92 is closed to hold the brake pedal in the same position for the desired number of seconds. Previously it was assumed that a force-sensitive control was desirable for the holding portion of the high level brake test. But owing to the differences among, and idiosyncracies of, vehicle braking systems, particularly those incorporating power assist units, the testing apparatus may function unreliably if a force-sensitive control is used, because of a tendency to overshoot the desired brake effort test levels. The present invention overcomes this difficulty by using a hydraulic position-sensitive means to maintain the position of the brake pedal once the selected wheel brake effort has been reached.

When the brake application has continued for the desired period, the shut-off valve 92 is opened, and the air pressure control valves 32 and 34 are returned to their air pressure exhaust positions. The system will then return to its original released, or retracted, position.

As indicated throughout the foregoing description, it is contemplated that various modifications may be made in the selected mode of utilizing this invention without departing from its essential spirit and scope.

What is claimed is:

1. In a brake testing mechanism having an actuator for moving a brake applying member until a desired amount of brake actuation has occurred, a hydraulic subsystem which comprises:
   a variable volume chamber which reduces in volume as the actuator moves the brake applying member in the brake-applying direction;
   a hydraulic storage chamber connected to the variable volume chamber; and
   shut-off valve means for temporarily closing the connection between the hydraulic storage chamber and the variable volume chamber.

2. The mechanism set forth in claim 1 in which the hydraulic subsystem includes a second variable volume chamber which reduces in volume as the actuator is retracted with the shut-off valve means in its closed position.

3. The mechanism set forth in claim 2, in which:
   the actuator is a power actuator having a housing, a fluid pressure responsive piston therein, and a force-transmitting member moved by the piston to move the brake applying member; and the first variable volume chamber is defined by the annular space between the housing, the piston, and the force-transmitting member.

4. The mechanism set forth in claim 3 in which:
   the force-transmitting member is hollow and has a floating piston reciprocable within it normally urged toward the brake applying member; and
   the second variable volume chamber is defined by the floating piston and the inside of the hollow force-transmitting member.

5. The mechanism set forth in claim 1 in which the hydraulic subsystem includes a variable flow restriction which can limit the rate of brake applying movement of the actuator.

6. The mechanism set forth in claim 1 in which:
   the actuator is a power actuator having a housing, a fluid pressure responsive piston therein, and a force-transmitting member moved by the piston to move the brake applying member; and
   the variable volume chamber is defined by the annular space between the housing, the piston, and the force-transmitting member.

7. In a brake testing mechanism having a contact member adapted to apply force to the vehicle brake pedal, a fluid power actuator comprising an enclosure and a pressure responsive movable wall therein, and means for controlling the application of fluid pressure to move said movable wall with respect to said enclosure, the combination which comprises:
   a hollow force transmitting member which connects the movable wall to the contact member, said force transmitting member providing an internal chamber and an external annular chamber defined by the force transmitting member, the movable wall and the enclosure, said internal and external chambers being interconnected by at least one port remote from the contact member, and said internal chamber being vented to the atmosphere by a port near the contact member;

spring means for returning the movable wall, the force transmitting member and the contact member to their retracted position;

hydraulic storage means comprising a variable volume reservoir arranged to maintain above atmospheric pressure on the hydraulic fluid, and a connecting passage between the reservoir and the annular chamber permitting flow of fluid back and florth therebetween;

a piston reciprocable inside the force transmitting member and subjected to the opposing pressures of the hydraulic fluid on the side toward the movable wall and of the atmosphere on the side toward the contact member, said piston normally being held in operative engagement with the contact member by the hydraulic fluid;

a variable flow restriction means in the connecting passage between the reservoir and the annular chamber to permit changing the rate of flow of hydraulic fluid in the hydraulic storage means; and a shut-off valve in the connecting passage between the reservoir and the annular chamber which permits cutting off the reservoir from the annular chamber, thereby preventing further brake-applying motion of the movable wall while fluid pressure is being exerted thereon tending to cause such brake-applying motion, and tending to develop a vacuum in the annular chamber and in the chamber between the piston and the movable wall when the latter is retracted by the spring means, which causes the atmospheric pressure on the other side of the piston to move it along the internal chamber toward the movable wall a distance which measures the length of the return stroke.

8. In a brake testing mechanism which moves a brake applying member to apply pressure to a braking system, the combination which comprises:

a control device which moves the brake applying member until a predetermined brake application level is reached; and a position responsive device which records the distance moved by the brake applying member under the influence of the control device and limits the next brake applying motion of the control device and brake applying member to that distance.

9. That method of testing vehicle brakes which comprises:

applying force to move a brake-applying member until a desired level of brake actuation is reached;

displacing hydraulic fluid which is independent of the applying force during the movement of the brake applying member;

stopping such hydraulic fluid displacement whenever the desired level of brake actuation is reached, thereby preventing further movement of the brake applying member beyond the position reached; and maintaining that position for the desired period of the test.

10. That method of testing vehicle brakes which comprises:

applying force to move a brake applying member until a desired level of brake effort is reached;

displacing hydraulic fluid during the movement of the brake applying member;

stopping such hydraulic fluid displacement whenever the desired level of brake effort is reached;

removing force from the brake applying member, thereby permitting it to return to its original position;

preventing return of the displaced hydraulic fluid during the return of the brake applying member;

measuring the volume of the hydraulic fluid displacement during the return of the brake applying member; and applying force again to move the brake applying member through the distance measured by the hydraulic fluid displacement.

11. In a brake testing mechanism having an actuator for moving a brake applying member until a measured brake effort level is reached:

means for displacing hydraulic fluid during movement of the brake applying member by the actuator; and means responsive to the measured brake effort level for establishing a holding position for the testing mechanism by blocking further hydraulic displacement.

12. The mechanism set forth in claim 11 in which the means for establishing a holding position acts on the hydraulic fluid downstream from the hydraulic fluid displacing means.

13. The mechanism set forth in claim 11 in which the actuator supplies a continuing holding force in excess of that required to reach the measured brake effort level.

14. In a brake testing mechanism having an actuator for moving a brake-applying member until a desired amount of brake actuation has occurred, a hydraulic portion which comprises:

a variable volume chamber which reduces in volume as the actuator moves the brake-applying member in the brake-applying direction; and automatic shut-off means operating independently of the actuator for preventing further reduction in volume of the variable volume chamber whenever the desired amount of brake actuation has occurred.

* * * * *